(12) United States Patent
Miyabe

(10) Patent No.: US 8,730,490 B2
(45) Date of Patent: May 20, 2014

(54) PRINTER DRIVER, INFORMATION PROCESSING APPARATUS, AND COMPUTER PROGRAM PRODUCT

(75) Inventor: Kazuhiro Miyabe, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 85 days.

(21) Appl. No.: 13/411,978

(22) Filed: Mar. 5, 2012

(65) Prior Publication Data

US 2012/0236346 A1 Sep. 20, 2012

(30) Foreign Application Priority Data

Mar. 18, 2011 (JP) .................. 2011-061544

(51) Int. Cl.
*G06F 15/00* (2006.01)
(52) U.S. Cl.
USPC ........................................ 358/1.13

(58) Field of Classification Search
USPC ........................................ 358/1.13
See application file for complete search history.

(56) References Cited

U.S. PATENT DOCUMENTS

2006/0103869 A1* 5/2006 Kato ........................... 358/1.13

FOREIGN PATENT DOCUMENTS

| JP | 2004-5608 | 1/2004 |
| JP | 2007-110689 | 4/2007 |

* cited by examiner

*Primary Examiner* — Saeid Ebrahimi Dehkordy

(74) *Attorney, Agent, or Firm* — Oblon, Spivak, McClelland, Maier & Neustadt, L.L.P.

(57) ABSTRACT

A printer driver that cooperates with a plug-in that can be added thereto and removed therefrom includes: a determining unit that determines whether or not the plug-in is used at predetermined timing at which a printing process is hooked; a reading unit that reads the plug-in that is determined by the determining unit; and a calling unit that calls the plug-in read by the reading unit.

8 Claims, 11 Drawing Sheets

FIG.3

```
{
    "functionA":
    {
        "filename":"functionA.dll",
        "supportevent":["DocumentEvent"],
        "supportpdl":["PCL6","PS"],
        "supportmodel":["ALL"]
    },
    "functionB":
    {
        "filename":"functionB.dll",
        "support":["uievent"]
        "supportpdl":["PCL6"],
        "supportmodel":["ModelB"]
    }
}
```

FIG.7

```
{
    "duplex": ~701
    {
        "filename":"duplex.dll",
        "supportevent":["DocumentEvent"],
        "supportpdl":["PCL6"],
        "supportmodel":["ALL"]
    },
    "preview": ~702
    {
        "filename":"preview.dll",
        "supportevent":["uievent"]
        "supportpdl":["PS"],
        "supportmodel":["ModelB"]
    }
}
```

FIG.9

```
{
    "duplex":
    {
        "filename":"duplex.dll",
        "supportevent":["DocumentEvent"],
        "supportpdl":["PCL6","PS"],        ───901
        "supportmodel":["ModelC"]          ───902
    },
    "preview":
    {
        "filename":"preview.dll",
        "supportevent":["uievent"]
        "supportpdl":["PS"],
        "supportmodel":["ModelB"]
    }
}
```

PRINTER DRIVER, INFORMATION PROCESSING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2011-061544 filed in Japan on Mar. 18, 2011.

BACKGROUND OF THE INVENTION

1. Field of the Invention

The present invention relates to a printer driver, an information processing apparatus, and a computer program product.

2. Description of the Related Art

In a conventional operating system (OS), such as MS Windows (registered trademark), it is necessary to install a printer driver in order to perform a printing sequence for a printer. Functions of the printer controlled by the printer driver may be added or extended. Furthermore, the functions installed in a printer may be different depending on a request by a user. In such a case, the printer driver needs to cope with the functions installed in each of the printers.

As described above, when the functions installed in the printers vary from one printer to another, it is necessary to recompile the printer driver so as to fit the printer and to cope with the functions installed therein. However, there is a problem in that, if it is necessary to recompile the printer driver for each printer, the workload of an administrator increases.

Japanese Patent Application Laid-open No. 2004-005608 discloses a technology for adding a plug-in module to a printer driver in accordance with the functions of the printer. By adding the plug-in module, it is possible to dynamically extend the functions of the printer driver so as to adjust to the printer.

However, there is a problem in that, as the number of installed plug-ins increases, it takes a longer time to read the printer driver and the plug-ins when the printing process is performed.

The present embodiment has been devised in consideration of the foregoing, and the present embodiment provides: a printer driver by which time needed to read the printer driver and the plug-ins is reduced when a printing process is performed; an information processing apparatus; and a computer program product.

SUMMARY OF THE INVENTION

It is an object of the present invention to at least partially solve the problems in the conventional technology.

A printer driver that cooperates with a plug-in that can be added thereto and removed therefrom includes: a determining unit that determines whether or not the plug-in is used at predetermined timing at which a printing process is hooked; a reading unit that reads the plug-in that is determined by the determining unit; and a calling unit that calls the plug-in read by the reading unit.

An information processing apparatus includes a printer driver installed therein for cooperating with a plug-in that can be added to and removed from the printer driver. The printer driver includes: a determining unit that determines whether or not the plug-in is used at predetermined timing at which a printing process is hooked; a reading unit that reads the plug-in that is determined by the determining unit; and a calling unit that calls the plug-in read by the reading unit.

An information processing method implemented in the information processing apparatus mentioned above includes: determining whether or not the plug-in is used at predetermined timing at which a printing process is hooked; reading the plug-in that is determined by the determining; and calling the plug-in read by the reading.

A computer program product includes a non-transitory computer-usable medium having a computer-readable program code embodied in the medium causing a computer to instruct a printer driver that cooperates with a plug-in that can be added thereto and removed therefrom to function as: a determining unit that determines the plug-in that has a possibility to be used at predetermined timing at which a printing process is hooked; a reading unit that reads the plug-in that the determining unit has determined to have the possibility to be used; and a calling unit that calls the plug-in read by the reading unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram that illustrates the structure of a plug-in information file according to the embodiment;

FIG. 7 is a diagram that illustrates a first example of the plug-in information file according to the embodiment;

FIG. 9 is a diagram that illustrates a second example of the plug-in information file according to the embodiment;

DETAILED DESCRIPTION OF THE PREFERRED EMBODIMENT

An exemplary embodiment of a printer driver, an information processing apparatus, and a computer program product according to the present embodiment is explained in detail below with reference to the accompanying drawings.

Embodiment

Figure 1:
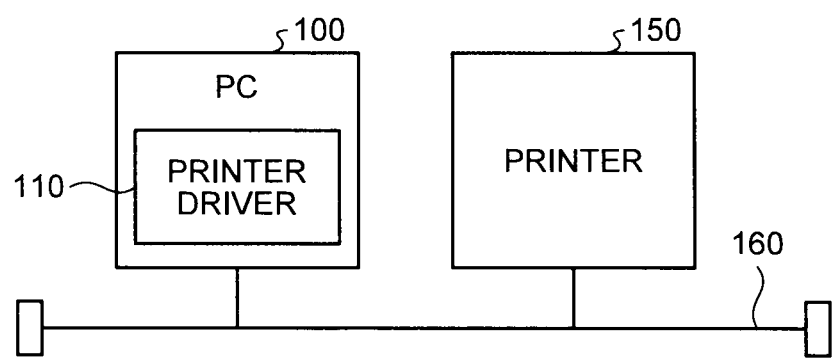
FIG. 1 is a diagram that illustrates the overall configuration of a printer system according to an embodiment.

FIG. 1 is a diagram that illustrates the overall configuration of a printer system according to the embodiment. As illustrated in FIG. 1, according to the present embodiment, a PC 100 is connected to a printer 150 via a network 160. The printer 150 performs a printing process in response to a print request received from a printer driver 110 that is installed in the PC 100.

Figure 2:
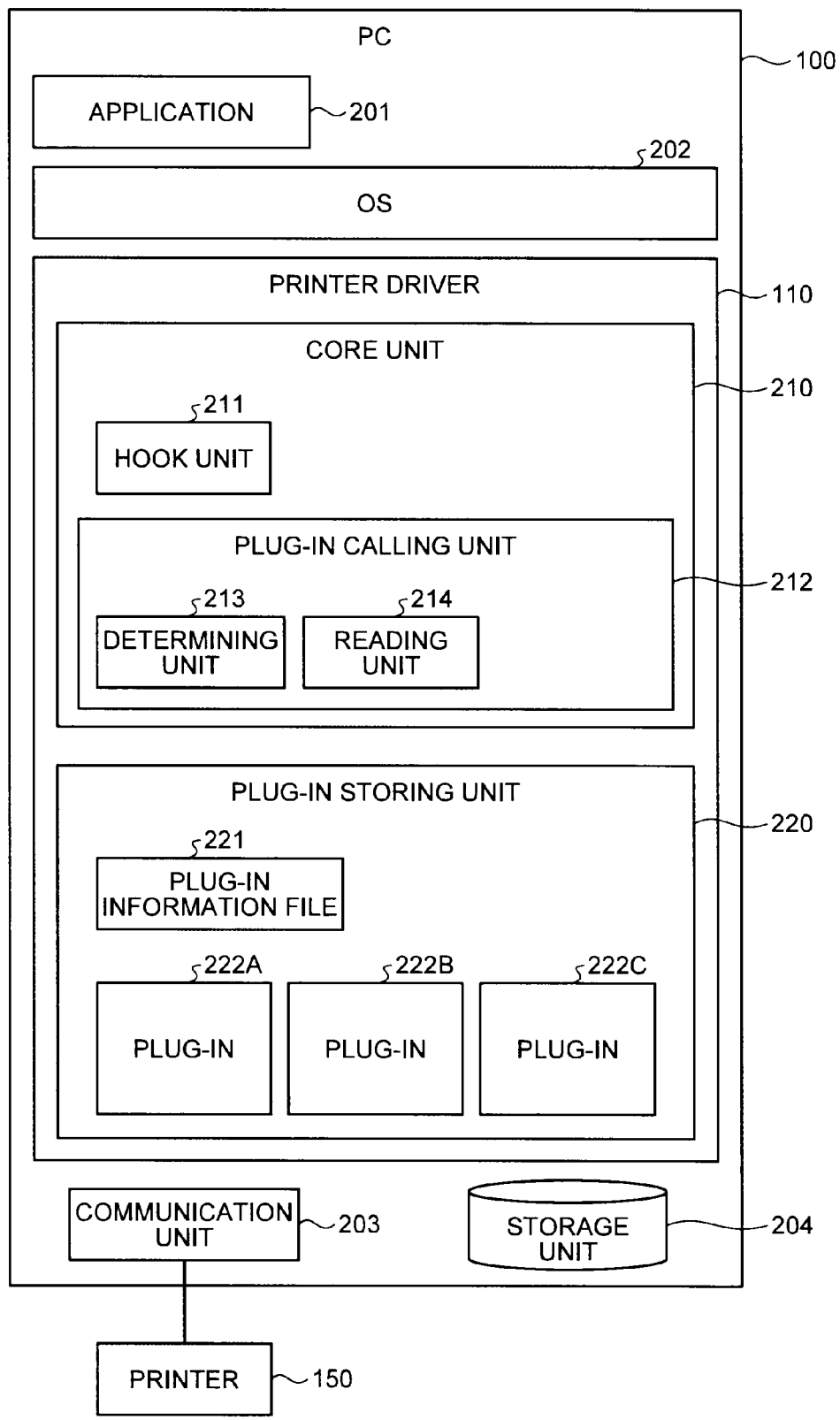
FIG. 2 is a block diagram that illustrates the configuration of a PC according to the embodiment.

FIG. 2 is a block diagram that illustrates the configuration of the PC 100. As illustrated in FIG. 2, the PC 100 includes an application 201, an OS 202, the printer driver 110, a communication unit 203, and a storage unit 204. When the PC 100 starts up and operates, the application 201, the OS 202, and the printer driver 110, which are stored in the storage unit 204, are loaded into and expanded in a main memory (not illustrated) and then executed by a central processing unit (CPU) (not illustrated). The PC 100 has the hardware configuration using a conventional computer that includes an input device, such as a keyboard or mouse, an output device, such as a display, and the like. For ease of explanation, they are omitted from FIG. 2.

The application 201 can be any software by which a user can issue a print command. If the user wishes to print out data that is edited by using the application 201, the application 201 receives a print command from the user. In this case, the application 201 does not generate print data for the printer 150 by itself. Instead, the application 201 sends, to the OS 202, information about a target to be printed as well as a print request in accordance with the above-described print command.

The OS 202 is a computer program that controls the hardware and software of the PC 100. For example, the OS 202 performs control for starting a computer program and reading and storing information. According to the present embodiment, an explanation is given of a case where MS Windows (registered trademark) is used as the OS.

The communication unit 203 transmits and receives information to and from the printer 150 to which the communication unit 203 is connected via the network 160.

The storage unit 204 is a storage unit that stores therein various types of information. For example, a hard disc drive (HDD) is used as the storage unit 204. Information stored in the storage unit 204 includes, for example, computer programs such as the application 201, the OS 202, and the printer driver 110, and various plug-ins which are read by the printer driver 110. The information further includes a plug-in information file, or the like, which will be described later.

The printer driver 110 includes a core unit 210 and a plug-in holding unit 220 as module groups for performing the functions of the driver. The printer driver 110 according to the present embodiment cooperates with a plug-in that can be added or removed, as described below.

The plug-in holding unit 220 holds therein a plug-in information file 221 and a plurality of plug-ins that can be called by the core unit 210. The plug-in holding unit 220 according to the present embodiment holds a plug-in 222A, a plug-in 222B, and a plug-in 222C; however, FIG. 2 is only an example and plug-ins can be optionally added or removed.

Information about the plug-ins (the plug-in 222A, the plug-in 222B, and the plug-in 222C in the example illustrated in FIG. 2) that can be read by the printer driver 110 is written in the plug-in information file 221.

FIG. 3 is a diagram that illustrates the structure of the plug-in information file 221. As illustrated in FIG. 3, the plug-in information file 221 is made up of a plurality of functions. The function "function*" is provided for each plug-in that is held in the plug-in holding unit 220.

An explanation is given of each parameter stored in the function. Each parameter indicated in the function is shown as a condition for reading the plug-in that is listed in the function. The "filename" is a file name that indicates a plug-in. The "supportevent" represents a process (event) that corresponds to the plug-in among the processes that can be performed by the printer driver 110. The "supportpdl" represents a page description language (PDL) that corresponds to the plug-in. The "supportmodel" represents the model of printer which the plug-in supports.

The example illustrated in FIG. 3 shows that the plug-in file in which the function "functionA" is implemented is "functionA.dll". It shows that the plug-in that implements the function "functionA" supports the process named "DocumentEvent", the PDLs named "PCL6" and "PS", and all models of printers.

It also shows that the plug-in file in which the function "functionB" is implemented is "functionB.dll". It shows that the process, the PDL, and the model of printer supported by the plug-in that implements the function "functionB" are, respectively, "uievent", "PCL6" only, and "ModelB" only.

In the plug-in information file described above, for example, when a document written in "PCL6", which is a PDL, is to be printed, only "functionA" needs to be called so as to execute a process specified by "DocumentEvent".

Referring back to FIG. 2, the core unit 210 has a universal function, as the printer driver 110, which does not cause any difference in the printing process due to a difference in the model of the printer, the PDL, or the like. The core unit 210 includes a hook unit 211 and a plug-in calling unit 212 as the module groups for performing a particular process so as to support the model and the PDL as the printer driver 110. The core unit 210 transfers part of a process to a plug-in through the plug-in calling unit 212 without examining the presence or absence of the plug-in.

The hook unit 211 hooks the process during the printing sequence that is performed by the core unit 210 so that the particular process is performed by the plug-in, or the like. An interface for enabling to hook a printing process is prepared on the OS 202 side, so that the particular process can be performed at predetermined timing.

For example, MS Windows (registered trademark) includes an interface called "DocumentEvent", which is a printer driver interface. Similarly, when the OS 202 is about to perform a particular process, the OS 202 calls an interface for hooking a printing process performed by the printer driver 110, thereby to perform the particular process.

As described above, if a particular process is to be performed during the printing process that is performed in accordance with the call from the OS 202 according to the present embodiment, the printing process can be hooked at specific timing. Thus, it is possible to change the print setting during printing or to add information to the information that is to be transmitted to the printer.

According to the present embodiment, the timing to perform hooking by the OS 202 is set as the time when a printing process starts, when printing of a document starts/ends, when printing of a page starts/ends, or the like. An instruction of the OS 202 for performing a particular process by hooking the printing process at the timing listed above is started when the plug-in calling unit 212 calls a plug-in "DocumentEvent".

The plug-in calling unit 212 calls various plug-ins held in the plug-in holding unit 220. When checking the installed plug-in, the plug-in calling unit 212 refers to the plug-in information file 221. Thus, the core unit 210 can check the installed plug-in. Furthermore, the plug-in calling unit 212 includes a determining unit 213 and a reading unit 214 as the module groups for calling plug-ins.

The determining unit 213 determines a plug-in that has a possibility to be used at predetermined timing at which the printing process performed by the printer driver 110 is hooked. The plug-in that has been determined to have the possibility to be used is loaded (read) by the reading unit 214. The predetermined timing according to the present embodiment is set as the time when the printing process starts, when printing of the document starts/ends, when printing of the page starts/ends, or the like. In the determination, the determining unit 213 according to the present embodiment refers to the plug-in information file 221 and performs a determination for each plug-in according to the plug-in information file 221. As described above, the conditions for reading each of the plug-ins are described in the plug-in information file 221.

The plug-in information file 221 contains, as the conditions for reading each of the plug-ins, the condition related to the timing at which the plug-in is executed during a printing process, the condition to show whether a plug-in module supports intermediate data, which is a target of the printing process, and the condition that shows whether a plug-in supports the model of printer that is an output destination. The determining unit 213 determines a plug-in that is a target to be read by the reading unit 214 in accordance with the above conditions.

In a conventional technology, the printer driver needs to read a plug-in when performing a process. However, there is a problem in that, if the number of plug-ins to be read increases, it takes time to read the plug-ins. In a specific example, if there are several plug-ins, it is considered that the reading time does not cause a problem; however, if several dozens of plug-ins are installed in the PC 100, it takes a considerably long time to read the plug-ins. Therefore, a situation occurs in which the convenience for a user is degraded.

The printer driver 110 according to the present embodiment is set to determine whether each plug-in is a target to be read. Thus, only the plug-ins necessary for the printing process are read; therefore, the reading speed is increased and the convenience for the user is improved.

The reading unit 214 reads the plug-in that the determining unit 213 has determined as likely to be used.

The plug-in calling unit 212 calls the plug-in that has been read by the reading unit 214 so as to cause the plug-in to perform a process.

As described above, the printer driver 110 according to the present embodiment refers to the plug-in information file 221 so as to call only the necessary plug-ins.

Figure 4:
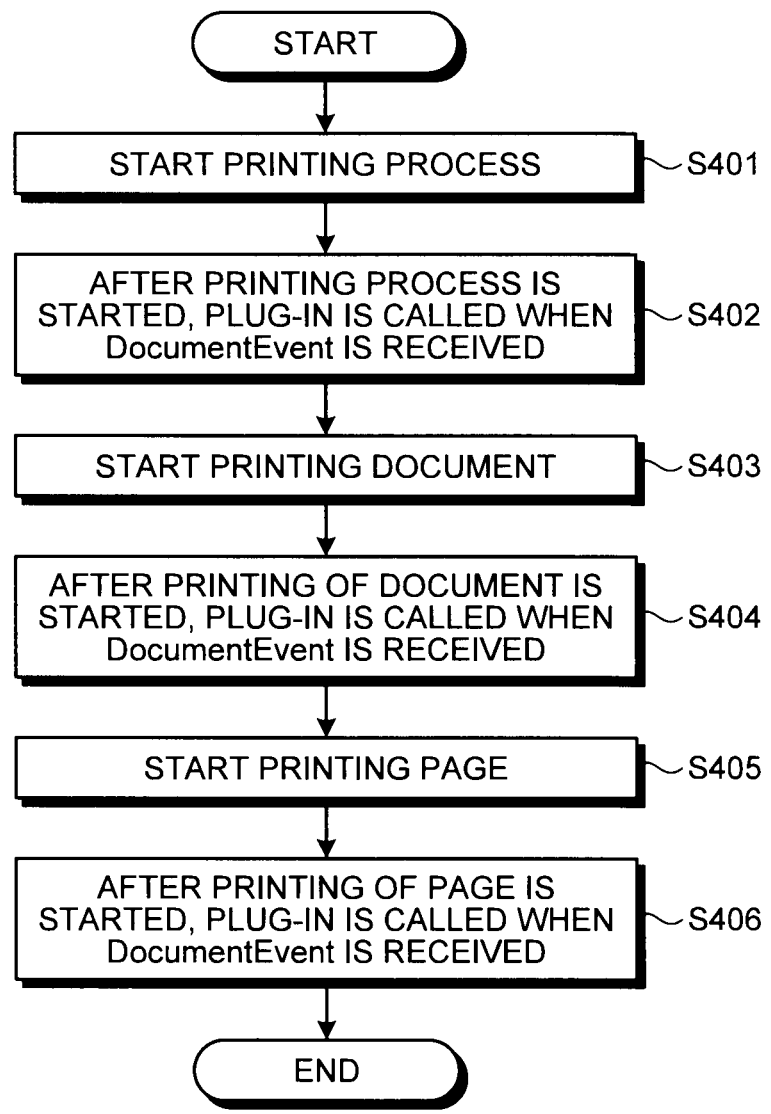
FIG. 4 is a flowchart that illustrates the steps of a process performed by a printer driver according to the embodiment when a printing process is started.

Next, an explanation is given of the timing at which the "DocumentEvent" is called when the printer driver 110 according to the present embodiment starts printing. FIG. 4 is a flowchart that illustrates the steps of a process performed by the printer driver 110 when the printer driver 110 starts the printing.

First, the printer driver 110 starts a printing process in response to a request received from the OS 202 (Step S401). When a call on the "DocumentEvent" is received from the OS 202 after the printer driver 110 starts the printing process, the hook unit 211 of the printer driver 110 hooks the printing process and the plug-in calling unit 212 calls a plug-in (Step S402).

Next, the printer driver 110 starts a process of printing a document in response to a request received from the OS 202 (Step S403). When a call on the "DocumentEvent" is received from the OS 202 after the printer driver 110 starts the process of printing the document, the hook unit 211 of the printer driver 110 hooks the process and the plug-in calling unit 212 calls a plug-in (Step S404).

Thereafter, the printer driver 110 starts printing a page in response to a request received from the OS 202 (Step S405). When a call on the "DocumentEvent" is received from the OS 202 after the printer driver 110 starts a process of printing the page, the hook unit 211 of the printer driver 110 hooks the process and the plug-in calling unit 212 calls a plug-in (Step S406).

The processes at Steps S405 and S406 are performed for each page contained in the document. Furthermore, the process is hooked by calling the "DocumentEvent" when the printing process ends, when printing of the document ends, and when printing of the page ends, as well as when the printing process starts, when printing of the document starts, and when printing of the page starts, as described above.

Figure 5:
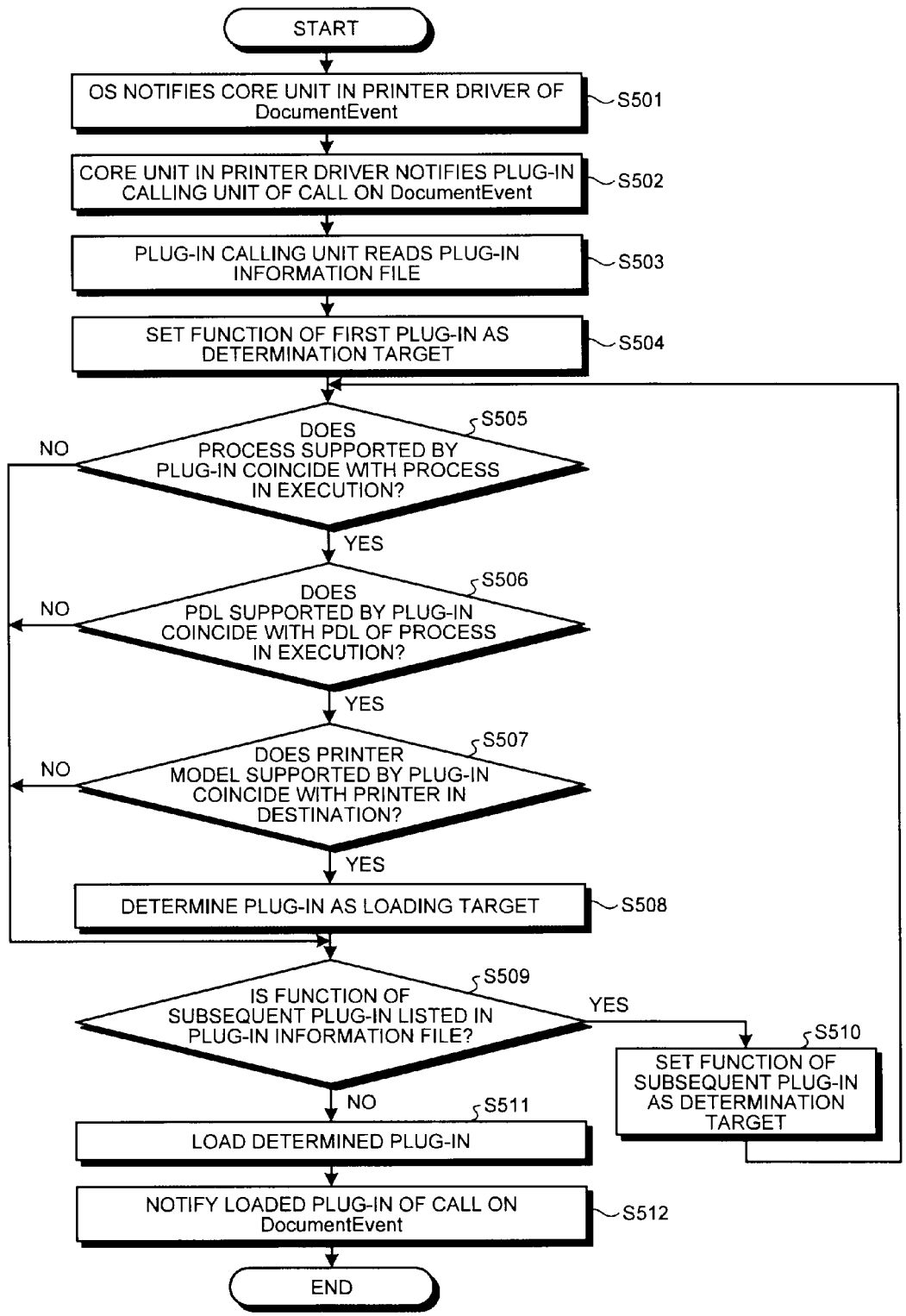
FIG. 5 is a flowchart that illustrates a process performed by the PC according to the embodiment when a notification of a call on "DocumentEvent" is made.

Next, an explanation is given of a process performed when a call on the "DocumentEvent" is received from the OS 202. FIG. 5 is a flowchart that illustrates a process performed by the PC 100 according to the present embodiment when a notification of the call on the "DocumentEvent" is made.

First, the OS 202 notifies the core unit 210 in the printer driver 110 of the call on the "DocumentEvent" (Step S501). After the hook unit 211 hooks a process in response to the reception of the notification, the core unit 210 in the printer driver 110 notifies the plug-in calling unit 212 of the call on the "DocumentEvent" (Step S502).

Next, the plug-in calling unit 212 reads the plug-in information file 221 (Step S503). Thereafter, a function of the first plug-in listed in the plug-in information file 221 is set as a determination target (Step S504).

Then, the determining unit 213 determines whether a process that is indicated by the function and is supported by a plug-in coincides with a process currently in execution (Step S505). In this flow, it is assumed that the process (instruction) currently in execution is the "DocumentEvent" received as the call on the notification. If it is determined that the coincidence is not obtained (Step S505: No), the plug-in indicated by the function is not loaded, and the process proceeds to Step S509.

Conversely, if the determining unit 213 determines that the process supported by the plug-in coincides with the process currently in execution (Step S505: Yes), it is determined whether the PDL that is supported by the plug-in and is indicated by the function coincides with the PDL that is a target of the process currently in execution (Step S506). If it is determined that they do not coincide with each other (Step S506: No), the plug-in indicated by the function is not loaded, and the process proceeds to Step S509.

Conversely, if the determining unit 213 determines that a PDL supported by the plug-in coincides with the PDL that is a target of the process currently in execution (Step S506: Yes), it is determined whether a printer model that is indicated by the function and is supported by the plug-in coincides with the model of the printer 150 that is a printing destination (Step S507). If it is determined that they do not coincide with each other (Step S507: No), the plug-in indicated by the function is not loaded, and the process proceeds to Step S509.

Conversely, if the determining unit 213 determines that the printer model supported by the plug-in coincides with the model of the printer 150 that is a printing destination (Step S507: Yes), the plug-in indicated by the function is determined as a loading target (Step S508).

Next, the determining unit 213 determines whether the plug-in information file 221 lists the function of a subsequent plug-in (Step S509). If it is determined that the function of the subsequent plug-in is listed therein (Step S509: Yes), the function of the subsequent plug-in is set as a determination target (Step S510). Then, the process returns to Step S505 for restarting thereof.

If the determining unit 213 determines that determination has been completed for all the functions of the subsequent plug-in and the function of the subsequent plug-in is not listed in the plug-in information file 221 (Step S509: No), the reading unit 214 loads the plug-in that has been determined at Step S508 (Step S511).

Thereafter, the plug-in calling unit 212 notifies the loaded plug-in of the call on the "DocumentEvent" (Step S512).

By performing the above-described steps of the process sequence, only the necessary plug-ins are loaded, and the plug-ins are notified of the call on the "DocumentEvent".

Figure 6:
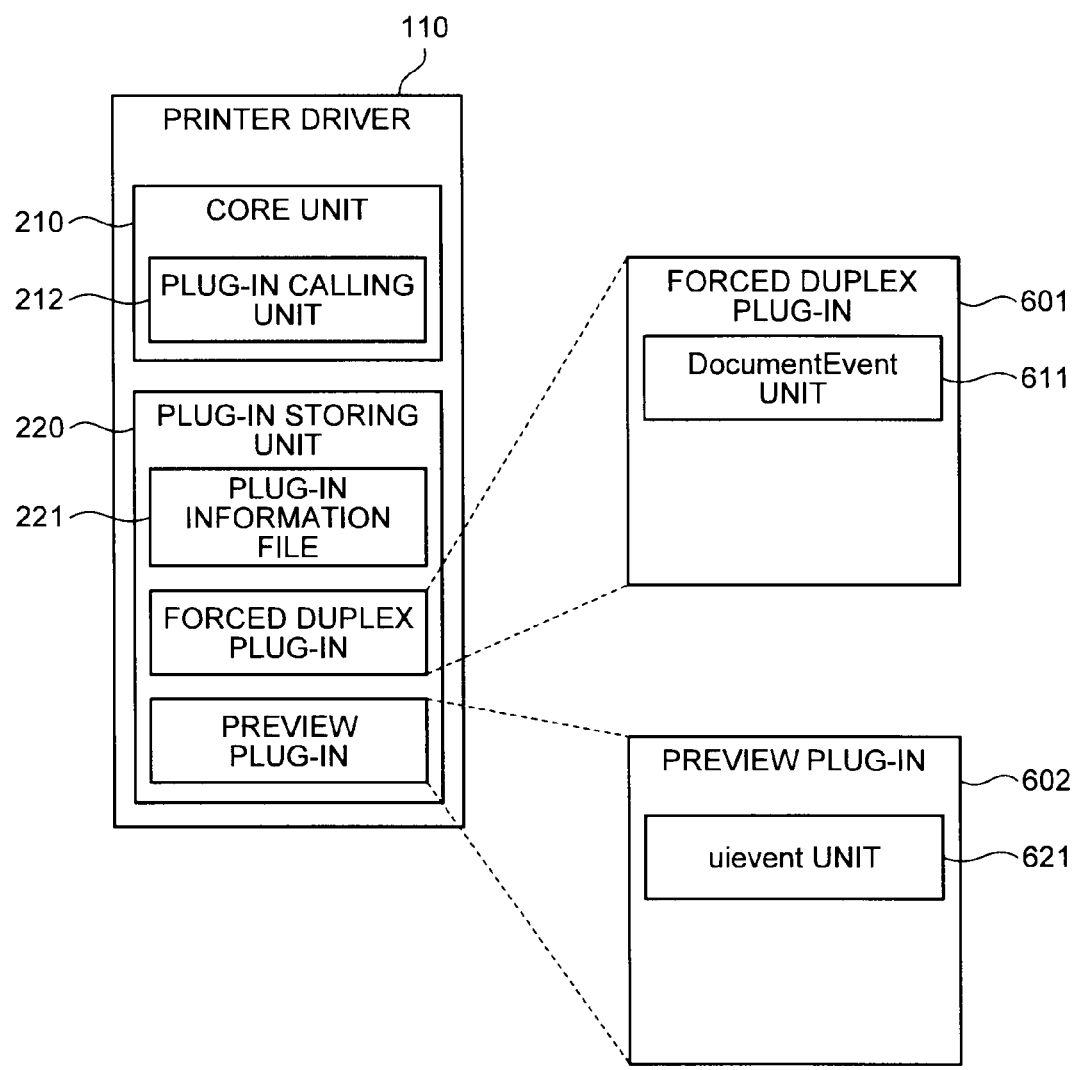
FIG. 6 is a diagram that illustrates an exemplary configuration that is obtained when a forced duplex plug-in and a preview plug-in are installed in the printer driver according to the embodiment.

Next, a detailed explanation is given of a process to be performed when a forced duplex plug-in, or the like, is installed. FIG. 6 is a diagram that illustrates an exemplary configuration that is obtained when a forced duplex plug-in 601 and a preview plug-in 602 are installed in the printer driver 110.

The forced duplex plug-in 601 includes a DocumentEvent unit 611 and is a plug-in that forces duplex printing. The DocumentEvent unit 611 is an interface that receives a notification of a call on the "DocumentEvent" from the plug-in calling unit 212. When the notification is received, the DocumentEvent unit 611 performs a process for duplex printing.

The forced duplex plug-in 601 has a function for executing forced duplex printing. The forced duplex plug-in 601 has a function of checking the print setting and a function of displaying an alarm dialogue to a user in starting printing of the document if duplex printing is set to "off". The forced duplex plug-in 601 further has a function of receiving, through the alarm dialogue, the user's selection as to whether duplex printing is to be set to "on" or printing is to be interrupted. Upon receiving the setting for changing the duplex printing to "on", the forced duplex plug-in 601 changes the duplex printing in the print setting to "on" and continues printing. Alternatively, upon receiving the selection that printing is to be interrupted, the forced duplex plug-in 601 interrupts printing.

The preview plug-in 602 includes a uievent unit 621 and is used for previewing a plug-in. The uievent unit 621 is an interface that receives a notification of a call on "uievent" from the plug-in calling unit 212. When the notification is received, the uievent unit 621 performs a process for a preview. The notification of the call on "uievent" is made by the OS 202 when an operation related to a user interface, or the like, is performed. That is, the preview plug-in 602 is a plug-in that is loaded only when an operation related to a user interface is performed.

FIG. 7 is a diagram that illustrates a first example of the plug-in information file. A "duplex" function 701 represents the forced duplex plug-in 601, and a "preview" function 702 represents the preview plug-in 602.

As seen in the "duplex" function 701, the forced duplex plug-in 601 is called if a notification of a call on the "DocumentEvent" is made and the PDL in the call is "PCL6". There is no need for a model of a printer to be specified in the call.

Conversely, as seen in the "preview" function 702, the preview plug-in 602 is called if a notification of a call on "uievent" is made, the PDL in the call is "PS", and the model of printer in the call is "ModelB".

Figure 8:
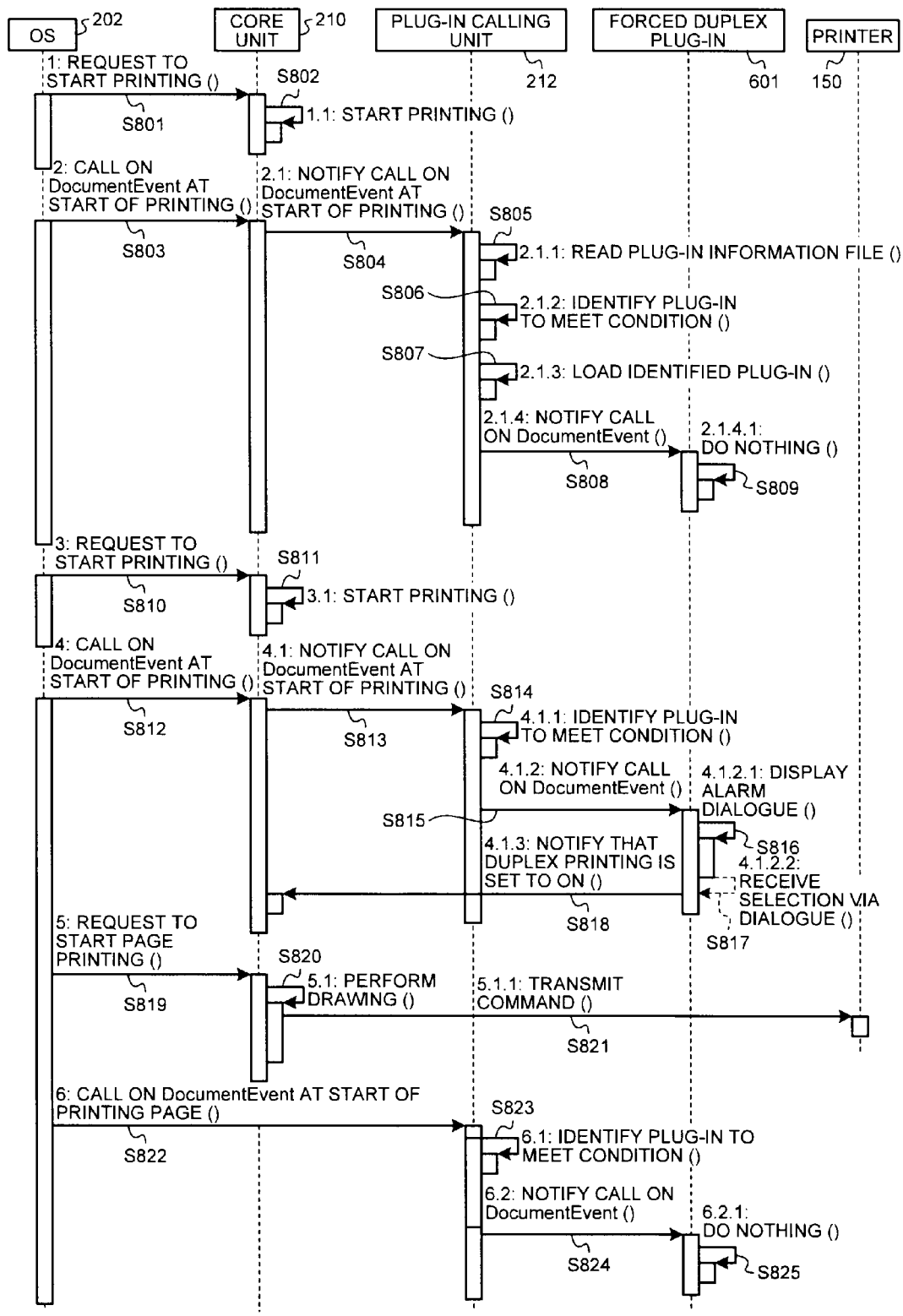
FIG. 8 is a diagram that illustrates an exemplary sequence of a printing process performed by the PC and the printer according to the embodiment.

Next, an explanation is given of a printing process performed by the PC 100 and the printer 150 according to the embodiment if the above plug-ins are provided. FIG. 8 is a diagram that illustrates an exemplary sequence of the printing process performed by the PC 100 and the printer 150 according to the embodiment. In this sequence diagram, it is assumed that the duplex printing is set to "off" when the process starts.

First, the OS 202 requests the core unit 210 in the printer driver 110 to start a printing process (Step S801). Next, the core unit 210 performs a process to start printing (Step S802).

Thereafter, the hook unit 211 in the core unit 210 receives a call on the "DocumentEvent" at a start of the printing from the OS 202 (Step S803) and hooks the process for starting the printing.

The core unit 210 then notifies the plug-in calling unit 212 of the call on the "DocumentEvent" at the start of the printing (Step S804). Upon receiving the notification, the plug-in calling unit 212 reads the plug-in information file 221 (Step S805). The read plug-in information file 221 is stored in a memory area of a random access memory (RAM) (not illustrated), or the like, so as to be referenceable by the plug-in calling unit 212.

The determining unit 213 identifies a plug-in that meets the condition of the process for starting printing currently in execution by using the read plug-in information file 221 (Step S806). The reading unit 214 then loads the plug-in that has been identified at Step S806 (Step S807). In the present sequence, it is assumed that the forced duplex plug-in 601 is loaded at Step S807.

Then, the plug-in calling unit 212 notifies the loaded forced duplex plug-in 601 of a call on the "DocumentEvent" (Step S808). Upon receiving the notification of the call on the "DocumentEvent", the forced duplex plug-in 601 does nothing because there is no process to be performed at the start of the printing (Step S809).

Next, the OS 202 requests the core unit 210 of the printer driver 110 to start printing a document (Step S810). The core unit 210 then performs a process to start printing the document (Step S811).

The hook unit 211 of the core unit 210 then receives the call on the "DocumentEvent" at the start for printing the document from the OS 202 (Step S812) and then hooks the process for starting the printing of the document.

Thereafter, the core unit 210 notifies the plug-in calling unit 212 of the call on the "DocumentEvent" at the start of printing the document (Step S813). Upon receiving the notification, the plug-in calling unit 212 identifies a plug-in that meets the condition of the process currently in execution for starting printing by using the plug-in information file 221 that is stored in the memory area (Step S814). It is assumed that the forced duplex plug-in 601 is identified at Step S814. In this case, the reading unit 214 does not perform loading as the forced duplex plug-in 601 has been already loaded.

The, the plug-in calling unit 212 notifies the loaded forced duplex plug-in 601 of the call on the "DocumentEvent" (Step S815). Upon receiving the notification of the call on the "DocumentEvent", the forced duplex plug-in 601 displays an alarm dialogue showing that the duplex printing has not been set (Step S816). Thereafter, the forced duplex plug-in 601 receives a user's selection via the alarm dialogue (Step S817). In this sequence, it is assumed that the setting for the duplex printing to "on" is received.

Accordingly, the forced duplex plug-in 601 notifies the core unit 210 that the duplex printing is set to "on" (Step S818).

Thereafter, the OS 202 requests the core unit 210 of the printer driver 110 to start printing a page (Step S819). The core unit 210 then performs drawing to print the page (Step S820). The core unit 210 then transmits a command together with draw data to the printer 150 (Step S821).

The plug-in calling unit 212 then receives "DocumentEvent" at the start of printing of the page from the OS 202 (Step S822).

The plug-in calling unit 212 then identifies a plug-in that meets the condition of the process currently in execution for starting to print the page by using the plug-in information file 221 stored in the memory area (Step S823). At Step S823, it is assumed that the forced duplex plug-in 601 can be identified. In this case, the reading unit 214 does not perform loading as the forced duplex plug-in 601 has been already loaded.

Thereafter, the plug-in calling unit 212 notifies the forced duplex plug-in 601 of the call on the "DocumentEvent" (Step S824). Upon receiving the notification of the call on the "DocumentEvent", the forced duplex plug-in 601 does nothing because there is no process to be performed at the start of the printing (Step S825).

Next, an explanation is given of processes for identifying a plug-in at Steps S805 and S806 with reference to the flowchart illustrated in FIG. 5. Here, it is assumed that the printer driver 110 operates as a driver of "PCL6" for the PDL, the model of the printer 150 that the driver supports is "ModelA", a call on the "DocumentEvent" is received as a process command (event), and the plug-in information file 221 is the one illustrated in FIG. 7.

First, in the processes from Steps S501 to S503 illustrated in FIG. 5, the plug-in calling unit 212 performs the processes including the reading of the plug-in information file 221. Thereafter, the plug-in calling unit 212 sets the "duplex" function, which is listed at the beginning of the plug-in information file, as a target to be determined (Step S504).

The "duplex" function has members: "supportevent"; "supportpdl"; and "supportpdl", which are set as "DocumentEvent"; "PCL6"; and "ALL", respectively. Therefore, the determining unit 213 determines that coincidence is obtained at Steps S505 to S507 and identifies the forced duplex plug-in 601, which is represented by the "duplex" function 701 in FIG. 7, as a loading target (Step S508).

The "preview" function is set as a determination target after the processes at Steps S509 and S510.

The "preview" function has a member, "supportevent", which is "uievent"; therefore, the determining unit 213 determines that coincidence is not obtained at Step S505 (Step S505: No). Because determination has been made for all the functions in the plug-in information file 221 (Step S509: No), the reading unit 214 loads only the plug-in "duplex.dll" that represents the forced duplex plug-in 601 (Step S511) and notifies the loaded forced duplex plug-in 601 of the call on the "DocumentEvent" (Step S512).

Thus, it can be confirmed that, when "DocumentEvent" is called for performing an event, only the forced duplex plug-in 601 needs to be loaded and be notified of the event.

Next, an explanation is given of a process flow that is performed in the case of a plug-in information file different from the one illustrated in FIG. 7. FIG. 9 is a diagram that illustrates an exemplary plug-in information file used for explaining the process flow. The plug-in information file illustrated in FIG. 9 is different from the one illustrated in FIG. 7 in that "PS" 901 is added to "supportpdl" and "supportmodel" is changed to "ModelC" 902 in the "duplex" function.

Figure 10:
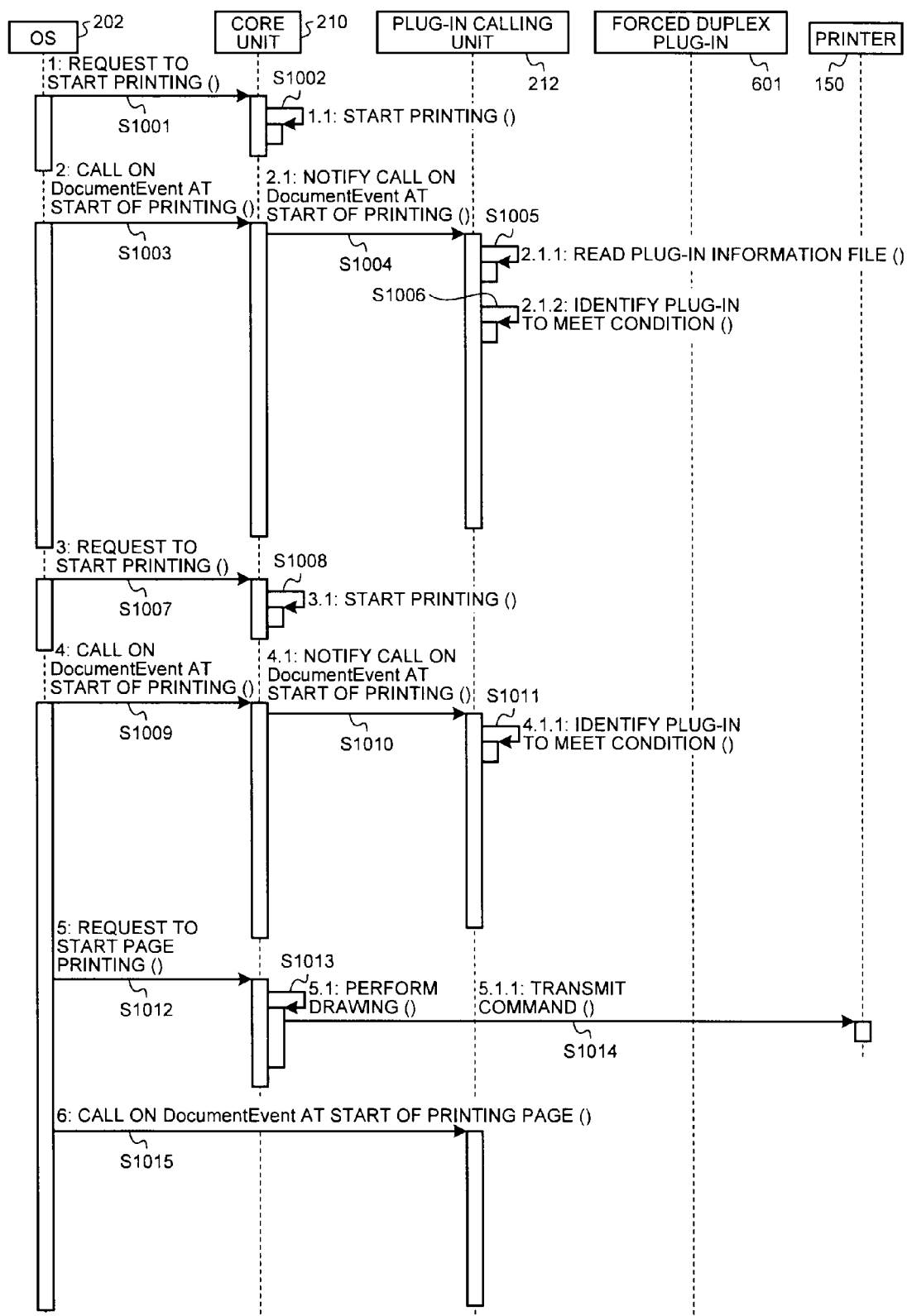
FIG. 10 is a diagram that illustrates an exemplary sequence of the printing process performed by the PC and the printer according to the embodiment.

Next, an explanation is given of a printing process performed by the PC 100 and the printer 150 when the plug-in information file illustrated in FIG. 9 is used. FIG. 10 is a diagram that illustrates an exemplary sequence of the printing process performed by the PC 100 and the printer 150 when the plug-in information file illustrated in FIG. 9 is used. In this sequence diagram, it is assumed that the duplex printing is set to "off" when the process starts. It is further assumed that the printer driver 110 operates as a driver of "PCL6" for the PDL, the model of the printer 150 that the driver supports is "ModelA", and a call on the "DocumentEvent" is received as a process command (event).

First, the same processes as those from Steps S801 to S805 in FIG. 8 are performed until the plug-in information file 221 is read (Steps S1001 to S1005). Thereafter, the determining unit 213 identifies a plug-in that meets the condition represented by "DocumentEvent" at the start of the printing process currently in execution based on the read plug-in information file (Step S1006). In this sequence, it is assumed that a plug-in to be loaded is not identified. Therefore, the reading unit 214 does not load a plug-in, or the like.

Thereafter, the same processes as those from Steps S810 to S814 in FIG. 8 are performed until a plug-in that meets the condition represented by the "DocumentEvent" at the start of the printing process currently in execution for printing the document is identified (Steps S1007 to S1011). In this process for starting to print the document, it is assumed that a plug-in to be loaded is not identified.

Furthermore, the same processes as those from Steps S819 to S822 in FIG. 8 are performed until a plug-in that meets the condition represented by the "DocumentEvent" at the start of printing a page is identified (Steps S1012 to S1015). In this process for starting to print the page, it is assumed that a plug-in to be loaded is not identified.

The above-described sequence shows an example in which loading of plug-ins is not performed because there is no plug-in that meets the condition. In this sequence, because there is no need to load a plug-in that is not for use, it is possible to reduce processing time and save a memory area.

Next, an explanation is given of a process for identifying a plug-in at Steps S1005 and S1006 with reference to the flowchart illustrated in FIG. 5.

First, in the processes from Steps S501 to S503 illustrated in FIG. 5, the plug-in calling unit 212 performs the processes including reading of the plug-in information file 221. Thereafter, the plug-in calling unit 212 sets the "duplex" function, which is listed at the beginning of the plug-in information file, as a determination target (Step S504).

The "duplex" function has members: "supportevent"; and "supportpdl", which are set as "DocumentEvent"; and "PCL6", respectively. Therefore, the determining unit 213 determines that coincidence is obtained at Steps S505 and S506. However, the determining unit 213 determines that coincidence is not obtained at Step S507 because "supportmodel", which is another member of the "preview" function, is "ModelC" whereas the model of the printer 150, which is a printing destination of the printer driver 110, is "ModelA" (Step S507: No). Thus, the forced duplex plug-in 601 is not identified as a loading target. After the subsequent "preview" function is set as a determination target (Steps S509, S510), the forced duplex plug-in 601 is not identified as a loading target by regarding the process as similar to the processes described above (Steps S505 to S509).

Thus, the reading unit 214 does not load any plug-ins, and the process is terminated (Steps S511 and S512).

In the PC 100 according to the present embodiment, the printer driver 110 performs a process without loading an unsupported plug-in; therefore, it is possible to suppress loading an unnecessary plug-in.

Thus, in the printer driver 110 according to the present embodiment, if there is a difference in the process of calling on "DocumentEvent" received from the OS 202 depending on the model of a printer or the type of a PDL, plug-ins to be read are only the ones necessary for the model of currently connected printer or for the PDL for which the printing process is currently performed; thus, it is possible to reduce the time it takes to read plug-ins.

The printer driver 110 according to the present embodiment has the above-described configuration so as to call only necessary plug-ins, whereby it is possible to reduce the reading time.

Figure 11:
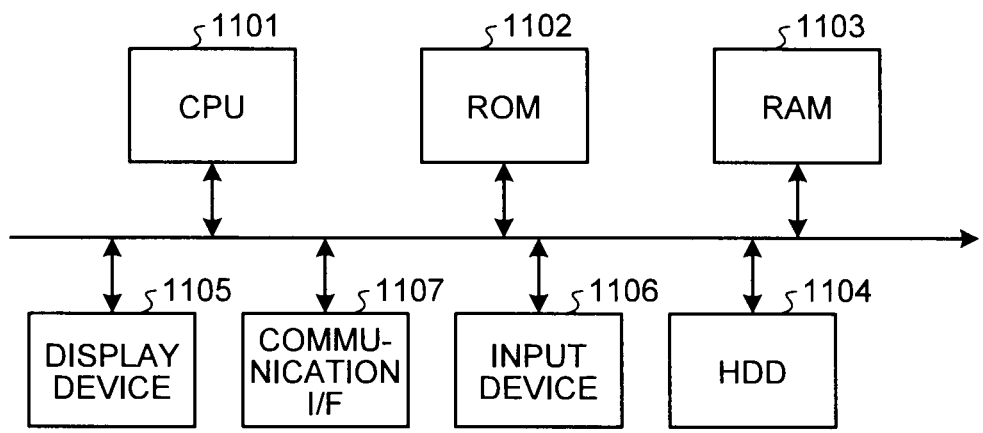
FIG. 11 is a diagram that illustrates the hardware configuration of the PC according to the embodiment.

FIG. 11 is a diagram that illustrates hardware configuration of the PC 100. As illustrated in FIG. 11, the PC 100 according to the present embodiment includes a CPU 1101 that performs control; a ROM (read only memory) 1102; a RAM 1103 that is a work area of the CPU 1101; an HDD 1104; a display device 1105 such as a screen display; an input device 1106, such as a keyboard or mouse; and a communication interface 1107. The PC 100 has the hardware configuration used in a conventional computer.

The printer driver 110 executed by the PC 100 according to the present embodiment is provided by being stored, in the form of a file that is installable or executable, in a recording medium readable by a computer, such as a CD-ROM, flexible disk (FD), CD-R, or digital versatile disk (DVD).

A configuration may be such that the printer driver 110 executed by the PC 100 according to the present embodiment is stored in a computer connected via a network, such as the Internet, and provided by being downloaded via the network. Moreover, a configuration may be such that the printer driver 110 executed by the PC 100 according to the present embodiment is provided or distributed via a network such as the Internet.

According to an aspect of the present embodiment, it is possible to reduce the time it takes to read a plug-in for performing a printing process.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus having a printing control program for cooperating with a plurality of plug-ins that can be added thereto and removed therefrom and reading a plug-in of the plurality of plug-ins to perform a printing process, the information processing apparatus comprising:
   a storage unit that stores therein plug-in information in which a process indicated by a printing-process-related notification is associated with a plug-in that is read to perform the process indicated by the printing-process-related notification, wherein
   the program causes the information processing apparatus to function as:
      a receiving unit that receives a printing-process-related notification;
      a determining unit that determines, when the receiving unit receives the printing-process-related notification, a plug-in to be read from the plurality of plug-ins in accordance with the process indicated by the received printing-process-related notification by referring to the plug-in information;
      a reading unit that reads the plug-in that is determined by the determining unit from the plurality of plug-ins; and
      a calling unit that calls the plug-in read by the reading unit.

2. The information processing apparatus according to claim 1, wherein the determining unit shows whether the plug-in supports intermediate data that is a target of the printing process.

3. The information processing apparatus according to claim 1, wherein the determining unit shows whether the plug-in supports a printer that is an output destination.

4. The information processing apparatus according to claim 1, wherein the receiving unit receives the printing-process-related notification from an operating system.

5. An information processing method implemented by an information processing apparatus having a printing control program for cooperating with a plurality of plug-ins that can be added thereto and removed therefrom and reading a plug-in of the plurality of plug-ins to perform a printing process, the information processing method comprising:
   storing, at a storage unit of the information processing apparatus, plug-in information in which a process indicated by a printing-process-related notification is associated with a plug-in that is read to perform the process indicated by the printing-process-related notification;
   receiving, by a receiving unit of the information processing apparatus, a printing-process-related notification;
   determining, by a determining unit of the information processing apparatus, when the receiving unit receives the printing-process-related notification, a plug-in to be read from the plurality of plug-ins in accordance with the process indicated by the received printing-process-related notification by referring to the plug-in information;
   reading, by a reading unit of the information processing apparatus, the plug-in that is determined by the determining unit from the plurality of plug-ins; and
   calling, by a calling unit if the information processing apparatus, the plug-in read by the reading unit.

6. The information processing method according to claim 5, further comprising showing whether the plug-in supports intermediate data that is a target of the printing process.

7. The information processing method according to claim 5, wherein further comprising showing whether the plug-in supports a printer that is an output destination.

8. A computer program product comprising a non-transitory computer-usable medium having a computer-readable program code embodied in the medium which when executed by an information processing apparatus, having a printing control program for cooperating with a plurality of plug-ins that can be added thereto and removed therefrom and reading a plug-in of the plurality of plug-ins to perform a printing process, causes the information processing apparatus to perform a method comprising:
   storing, at a storage unit of the information processing apparatus, plug-in information in which a process indicated by a printing-process-related notification is associated with a plug-in that is read to perform the process indicated by the printing-process-related notification;
   receiving, by a receiving unit of the information processing apparatus, a printing-process-related notification;
   determining, by a determining unit of the information processing apparatus, when the receiving unit receives the printing-process-related notification, a plug-in to be read from the plurality of plug-ins in accordance with the process indicated by the received printing-process-related notification by referring to the plug-in information;
   reading, by a reading unit of the information processing apparatus, the plug-in that is determined by the determining unit from the plurality of plug-ins; and calling, by a calling unit if the information processing apparatus, the plug-in read by the reading unit.

* * * * *